United States Patent [19]

Weavers et al.

[11] 4,177,896
[45] Dec. 11, 1979

[54] RECESSED HOOK AND HANDLE FOR A PLASTIC BOX

[75] Inventors: Mark W. Weavers, Little Canada; Anthony W. Konkler, Lakeland, both of Minn.

[73] Assignee: Minnesota Mining and Manufacturing Company, St. Paul, Minn.

[21] Appl. No.: 896,586

[22] Filed: Apr. 14, 1978

[51] Int. Cl.² .................. B65D 85/67; B65D 23/10
[52] U.S. Cl. .................. 206/387; 206/806; 220/94 A
[58] Field of Search .................. 206/387, 45.34, 228, 206/806; 220/94 A, 94

[56] References Cited
U.S. PATENT DOCUMENTS

| | | | |
|---|---|---|---|
| 2,685,970 | 8/1954 | Springer et al. | 206/228 |
| 3,324,997 | 6/1967 | Bonanno | 206/45.34 |
| 3,532,211 | 10/1970 | Gellert | 206/387 |
| 3,581,928 | 6/1971 | Amand | 220/94 A |
| 3,909,088 | 9/1975 | Dennehey et al. | 206/387 |

Primary Examiner—William T. Dixson, Jr.
Attorney, Agent, or Firm—Cruzan Alexander; Donald M. Sell; William L. Huebsch

[57] ABSTRACT

A rectangular plastic box for storing video cassettes which includes an unobtrusive hook portion by which the box may be hung on a horizontal member received through a recess in the box. The box also includes a handle portion along its edge opposite the hook which can be stored in a recess from the outer surface of the box, and can be swung out and manually engaged to facilitate carrying the box, or hanging it on or removing it from a horizontal member.

4 Claims, 5 Drawing Figures

RECESSED HOOK AND HANDLE FOR A PLASTIC BOX

BACKGROUND OF THE INVENTION

This invention relates to blow-molded plastic shipping and storage boxes of double wall construction.

Such boxes are widely used where economy, durability and light weight are desired. The light weight reduces shipping costs, and the double wall construction provides cushioning against shocks. Prior art boxes of this type are described in U.S. Pat. Nos. 3,536,435 (Schurman et al) and 3,659,999 (Schurman).

Heretofore, such boxes have made no provisions facilitating their orderly storage, except that the boxes have no projections to restrict their being stacked in side to side or edge to edge relationship.

SUMMARY OF THE INVENTION

The box according to the present invention includes an unobtrusive hook portion which does not project from the rectangular periphery of the box and can be used to store the box by hanging it on a horizontal member side by side with other such boxes; and a handle portion on the side of the box opposite the hook portion which can be manually engaged to carry the box, or to hang it on or remove it from a horizontal member; which handle portion may be stored in a position at which it also does not project to interfere with storage or shipment of the box.

The hook portion in the box according to the present invention projects toward one of its end walls and over a recess opening through the side walls and one edge wall of the box adjacent the other of its end walls, and is adapted to engage over a horizontal member extending through the recess. The handle portion is integrally formed with the edge wall opposite the hook member, and has thin flexible parts at its juncture with that edge wall which afford movement of the handle portion between a carrying position projecting from that edge wall, and a storage position with the handle portion generally parallel with that edge wall and releasably retained in a recess.

BRIEF DESCRIPTION OF THE DRAWING

The present invention will be more thoroughly explained with reference to the accompanying drawing wherein like numbers refer to like parts in the several views, and wherein.

DESCRIPTION OF THE PREFERRED EMBODIMENT

Figure 2:
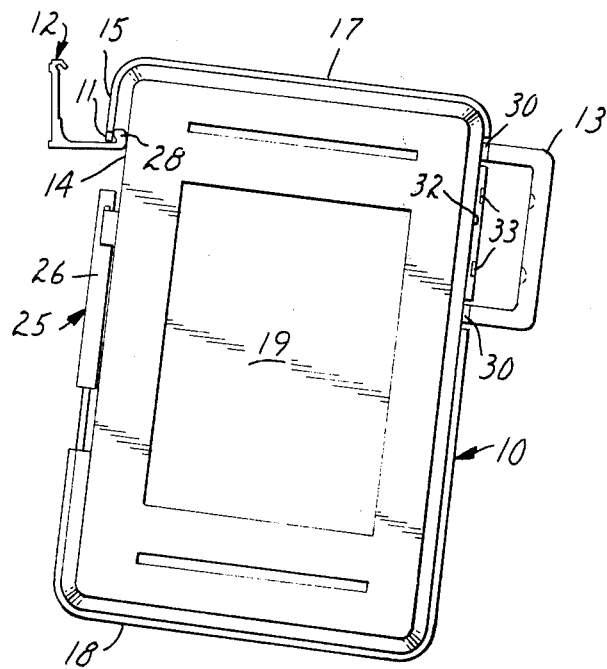
FIG. 2 is a reduced vertical side view of the box of FIG. 1 showing a hook portion of the box engaged with a horizontal member.
Figure 3:
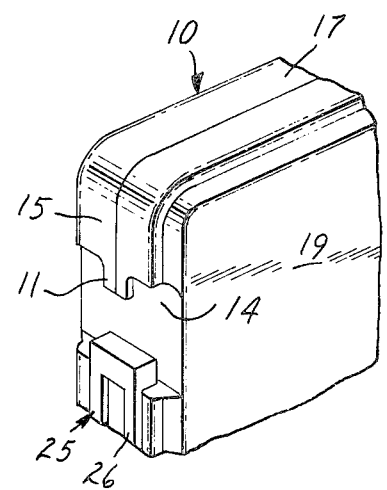
FIG. 3 is a fragmentary perspective view of the box of FIG. 1 showing its hook portion.

Referring now to the drawing there is shown a box 10 according to the present invention including a hook portion 11 adapted for hanging the box 10 on a horizontal member received in a recess 14 in the box (such as the horizontal member 12 illustrated in FIG. 2); and a handle portion 13 adapted for manual engagement to facilitate carrying the box 10, or hanging it on or removing it from a horizontal member.

As illustrated, the box 10 is adapted for storage and shipment of a video cassette, and may be blow molded of high density polyethylene. The box 10 has rectangularly disposed opposite edge walls 15 and 16, end walls 17 and 18, and side walls 19, and comprises container and cover parts which are hinged together by a hinge (not shown) along the edge wall 16 to afford opening and closing the box 10. The box 10 may be releasably retained in its closed position by a novel latch assembly 25 including a slide 26 movably mounted along the edge wall 15, the structure whereof is fully explained in copending patent application Ser. No. 896,603, also filed Apr. 14, 1978, the content whereof is hereby incorporated herein by reference.

The recess 14 opens through both of the side walls 19 and the edge wall 15 adjacent the end wall 17, with the hook portion 11 (half of which is on the container part and half on the cover part) projecting over the recess 14 toward the end wall 18 with its outer surface flush with the outer surface of the edge wall 15. The recess 14 can receive a horizontally extending member and allow the hook portion 11 to be engaged over it (such as over the rod-like lip 28 of the member 12 illustrated in FIG. 2), with the center of gravity of the box 10 being lower than the hook portion 11 to maintain engagement therebetween.

Figure 1:
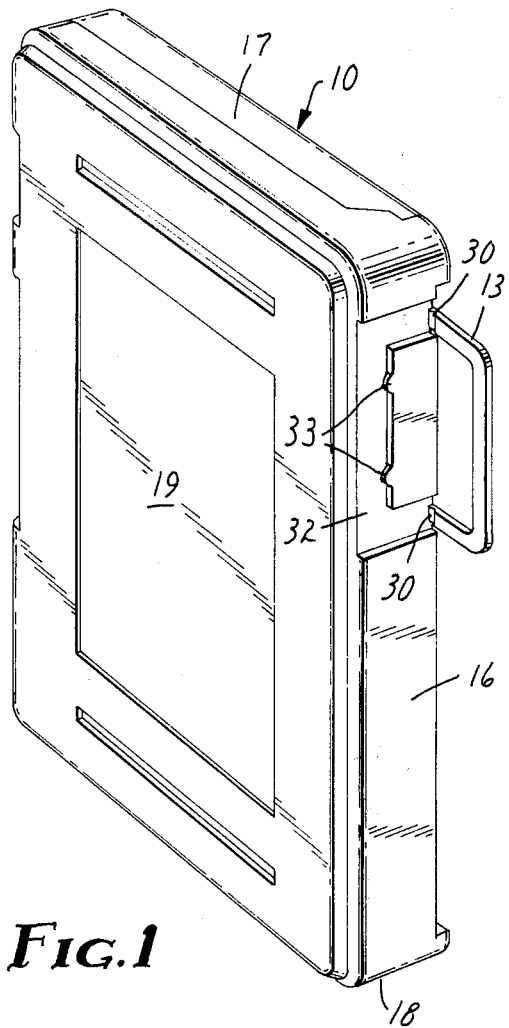
FIG. 1 is a perspective view of a storage box according to the present invention showing a handle portion of the box in a carrying position.
Figure 4:
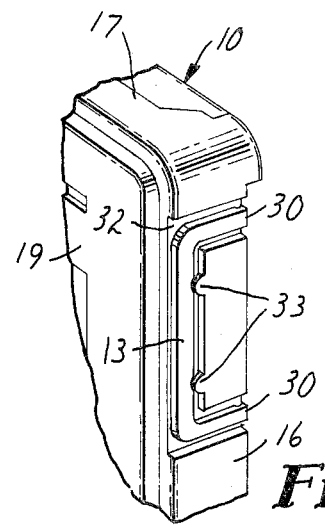
FIG. 4 is a fragmentary perspective view of the box of FIG. 1 showing its handle portion in a storage position.
Figure 5:
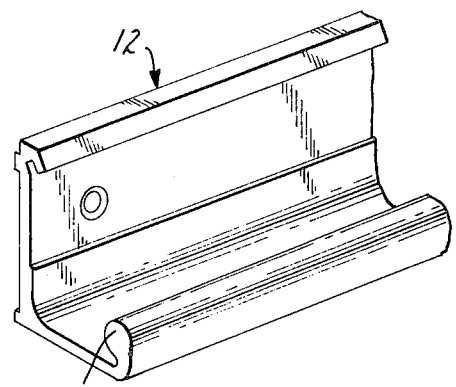
FIG. 5 is a perspective view of the horizontal member with which the hook portion of the box was engaged in FIG. 2.

The handle portion 13 is generally U-shaped and is integrally formed with the edge wall 16 adjacent the end wall 17. The handle portion 13 has two thin bendable parts 30 at its junctures with the edge wall 16 to afford movement of the handle portion 13 from a carrying position (FIGS. 1 and 2) at which it may be manually engaged to carry the box 10 and to engage it with or remove it from a horizontal member; and a storage position with the handle portion 13 parallel with and in a recess 32 in the edge wall 16 with its outer surface flush with the surface of the edge wall 16.

Means for releasably retaining the handle portion 13 in its storage position are provided by portions 33 of the edge wall 16 which project into the recess 32 and are undercut to receive mating thinned areas along the inner edge of the handle portion 13 when the handle portion 13 is in its storage position. The handle portion 13 is flexible enough to snap around the outer ends of the portions 33 to afford its movement between its carrying and storage positions.

We claim:

1. In a plastic box adapted for storage and shipment of a tape cassette, said box having rectangularly disposed first and second edge walls, first and second end walls, and opposed side walls, the improvement wherein said box has:

a recess opening through said side walls and said first edge wall adjacent said first end wall;

a hook portion projecting over a portion of said recess toward said second end wall so that the hook can be engaged with a horizontal member by passing the hook transversely over the horizontal member with the horizontal member being received in a position extending through said recess;

a handle portion adapted for manual engagement and integrally formed with said second edge wall adjacent said first end wall, said handle portion being thin and flexible at its juncture with said second edge wall to afford movement of said handle portion between a carrying position projecting from said second edge wall, and a storage position with said handle member generally parallel with said second edge wall;

a recess adapted to receive said handle member in its storage position; and means for releasably retaining said handle portion in its storage position.

2. A plastic box according to claim 1 wherein the outer surface of said hook portion is flush with the outer surface of said first edge wall.

3. A plastic box according to claim 1 or 2 wherein the outer surface of said handle portion in its storage position is flush with the outer surface of said second edge wall.

4. A plastic box according to claims 1 or 3 wherein said handle portion is generally U-shaped and said means for releasably retaining said handle portion in its storage position comprises undercut portions of said second end wall adapted to receive mating thinned areas along the inner surface of said U-shaped handle portion when it is in its storage position, said handle being sufficiently flexible to snap around the outer ends of said portions to afford movement of said handle portion between its carrying and storage positions.

* * * * *